United States Patent
Koseki et al.

(10) Patent No.: US 11,756,740 B2
(45) Date of Patent: Sep. 12, 2023

(54) ELECTRODE BODY, ELECTROLYTIC CAPACITOR PROVIDED WITH ELECTRODE BODY, AND METHOD FOR PRODUCING ELECTRODE BODY

(71) Applicant: NIPPON CHEMI-CON CORPORATION, Tokyo (JP)

(72) Inventors: Kazuya Koseki, Kanagawa (JP); Kazuma Okura, Kanagawa (JP); Kazuhiro Nagahara, Tokyo (JP); Kenji Machida, Ibaraki (JP)

(73) Assignee: NIPPON CHEMI-CON CORPORATION

( * ) Notice: Subject to any disclaimer, the term of this patent is extended or adjusted under 35 U.S.C. 154(b) by 282 days.

(21) Appl. No.: 17/057,545

(22) PCT Filed: Jun. 7, 2019

(86) PCT No.: PCT/JP2019/022741
§ 371 (c)(1),
(2) Date: Nov. 20, 2020

(87) PCT Pub. No.: WO2019/240041
PCT Pub. Date: Dec. 19, 2019

(65) Prior Publication Data
US 2021/0193395 A1    Jun. 24, 2021

(30) Foreign Application Priority Data
Jun. 11, 2018    (JP) .................. 2018-111486

(51) Int. Cl.
*H01G 9/042*    (2006.01)
*H01G 9/055*    (2006.01)

(52) U.S. Cl.
CPC .......... *H01G 9/0425* (2013.01); *H01G 9/042* (2013.01); *H01G 9/055* (2013.01)

(58) Field of Classification Search
CPC ....... H01G 9/055; H01G 9/042; H01G 9/0425
See application file for complete search history.

(56) References Cited

U.S. PATENT DOCUMENTS

| 2002/0001169 A1* | 1/2002 | Shiraishi ............... H01G 9/26 361/523 |
| 2005/0186473 A1 | 8/2005 | Mitchell et al. |

(Continued)

FOREIGN PATENT DOCUMENTS

| CN | 107533923 | 1/2018 |
| CN | 109830374 A * | 5/2019 |

(Continued)

OTHER PUBLICATIONS

Extended European Search Report for corresponding European Patent Application No. 19819506.7 (6 pages).

(Continued)

*Primary Examiner* — David M Sinclair (57) ABSTRACT

Provided is an electrode body that exhibits a good cathode side capacitance, and an electrolytic capacitor provided with this electrode body. The electrode body used for a cathode of the electrolytic capacitor has a cathode foil and a carbon layer. The cathode foil is made of a valve acting metal, and an enlarged surface layer is formed on the surface thereof. The carbon layer is formed on the enlarged surface layer. The interface between the enlarged surface layer and the carbon layer has an uneven shape.

19 Claims, 8 Drawing Sheets

(56) References Cited

U.S. PATENT DOCUMENTS

| | | | |
|---|---|---|---|
| 2011/0170229 A1 | 7/2011 | Imamura et al. | |
| 2012/0183859 A1* | 7/2012 | Sasaki | H01M 4/96 361/532 |
| 2018/0047511 A1 | 2/2018 | Tsuda | |
| 2019/0295777 A1 | 9/2019 | Yoshida | |
| 2019/0304704 A1* | 10/2019 | Ishimaru | H01G 9/0425 |

FOREIGN PATENT DOCUMENTS

| | | |
|---|---|---|
| JP | H 0461109 | 2/1992 |
| JP | 2006-80111 | 3/2006 |
| JP | 2007-305686 | 11/2007 |
| JP | 2016-105497 | 6/2016 |
| KR | 2011-0070830 | 6/2011 |
| WO | WO 2016/174806 | 11/2016 |
| WO | 2018/062319 A1 | 4/2018 |

OTHER PUBLICATIONS

Japanese Patent Office, Office Action for corresponding Japan Application No. 2020-525527, dated Mar. 22, 2022, and its English machine translation, 7 pages.

Chinese Patent Office, Office Action dated Apr. 8, 2022 for corresponding Chinese Patent Application No. 201980031503.6, and its English language machine translation, 20 pages.

Japan Patent Office, Office Action dated Jul. 19, 2022 for corresponding Japan Patent Application No. 2020-525527, and its English language machine translation, 11 pages.

TaiwanPatent Office, Office Action dated Aug. 2, 2022 for corresponding Taiwan Patent Application No. 108119976, and its English language machine translation, 17 pages.

Chinese Patent Office, Office Action for corresponding Chinese Application No. 201980031503.6 & its English machine translation, dated Aug. 23, 2021, 21 pages.

Japan Patent Office, Office Action, dated Feb. 7, 2023, for corresponding Japan Patent Application No. 2020-525527, and its English language machine translation, 8 pages.

Korean Patent Office, Office Action, dated Mar. 17, 2023, for corresponding Korean Patent No. 10-2020-7031080, and its English machine translation.

Taiwan Patent Office, Office Action, dated Jun. 2, 2023, for corresponding Taiwanese Patent Application No. 111141841, and its English machine translation.

* cited by examiner

ELECTRODE BODY, ELECTROLYTIC CAPACITOR PROVIDED WITH ELECTRODE BODY, AND METHOD FOR PRODUCING ELECTRODE BODY

TECHNICAL FIELD

The present disclosure relates to an electrode body, an electrolytic capacitor having the electrode body, and a method for manufacturing the electrode body.

BACKGROUND ART

The electrolytic capacitor includes a valve acting metal such as tantalum or aluminum as an anode foil and a cathode foil. The anode foil is enlarged by forming the valve acting metal into a shape such as a sintered body or an etching foil, and has a dielectric oxide film layer on the enlarged surface. An electrolytic solution is interposed between the anode foil and the cathode foil. The electrolytic solution is in close contact with the uneven surface of the anode foil and functions as a true cathode. In this electrolytic capacitor, a capacitance on the anode side is obtained by a dielectric polarization action of the dielectric oxide film layer.

The electrolytic capacitor can be regarded as a series capacitor in which capacitance is emerged on the anode side and the cathode side. Therefore, the cathode side capacitance is very important to efficiently utilize the anode side capacitance. Therefore, although the surface area of the cathode foil is increased by, for example, the etching treatment, there is a limit to the enlargement of the cathode foil from the viewpoint of the thickness of the cathode foil.

Therefore, the electrolytic capacitor in which a film of a metal nitride such as titanium nitride is formed on the cathode foil has been proposed (see Patent Document 1). Under a nitrogen gas environment, titanium is evaporated by a vacuum arc deposition method, which is a kind of ion plating method, and titanium nitride is deposited on the surface of the cathode foil. The metal nitride is inert, and it is difficult to form a natural oxide film. In addition, the deposited film is formed with fine unevenness and the surface area of the cathode is enlarged.

The electrolytic capacitor in which a porous carbon layer included activated carbon is formed on the cathode foil has been proposed (see Patent Document 2). A capacitance of the cathode side in this electrolytic capacitor is emerged by a storage action of the electric double layer formed on a boundary surface between a polar electrode and an electrolyte. Cations of the electrolyte are aligned at the boundary surface with the porous carbon layer and paired with electrons in the porous carbon layer at a very short distance, forming a potential barrier at the cathode. The cathode foil on which this porous carbon layer is formed is produced by kneading a water-soluble binder solution in which porous carbon is dispersed to form a paste, applying the paste to the surface of the cathode foil, and drying the paste by exposing it to a high temperature.

CITATION LIST

Patent Literature

Patent Document 1: JP H04-61109 A
Patent Document 2: JP 2006-80111 A

SUMMARY OF DISCLOSURE

Technical Problem

The deposition process of metal nitrides is complicated and difficult to introduce industrially, resulting in high cost and deterioration of yield of the electrolytic capacitors. The electrolytic capacitor in which the porous carbon layer containing the activated carbon is formed on the cathode foil by applying the paste has a lower capacitance in a normal temperature environment and a high temperature environment than the electrolytic capacitor in which the metal nitride is deposited on the cathode foil. Therefore, in the electrolytic capacitor in which the porous carbon layer is formed on the cathode foil by applying the paste, a satisfactory capacitance has not yet been obtained.

The present disclosure has been proposed to solve the above problems, and an objective of the present disclosure is to provide an electrode body that emerges good capacitance, an electrolytic capacitor having the electrode body, and a method for manufacturing the electrode body.

Solution to Problem

In order to solve the above problems, the electrode body according to the present invention is an electrode body used for a cathode of an electrolytic capacitor which includes a cathode foil made of a valve acting metal, having an enlarged surface layer formed on a surface, and a carbon layer formed on the enlarged surface layer, in which an interface between the enlarged surface layer and the carbon layer has an uneven shape.

An unevenness depth of the uneven shape may be 0.5 μm or more.

The enlarged surface layer may be formed by digging a plurality of etching pits, a diameter of the etching pit may be 0.12 μm or more and 0.43 μm or less near a surface layer, a depth of the etching pit may be 1.5 μm or more and 5.0 μm or less, in the uneven shape, a distance between both ends in a cross section obtained by cutting a convex region along a height direction may be 1.5 μm or more and 8.0 μm or less, and the uneven shape may have a convex region height of 0.15 μm or more and 0.80 μm or less.

The enlarged surface layer may be formed by digging a plurality of etching pits, and the carbon layer further enters the etching pit from an interface of the uneven shape.

The carbon layer that further enters the etching pit from a concave region may penetrate from an apex of the convex region adjacent to the concave region to a position that sinks by an average of 0.5 μm or more in a depth direction.

The carbon layer that further enters the etching pit from a concave region may penetrate from an apex of the convex region adjacent to the concave region to a position that sinks by an average of 0.7 μm or more in a depth direction.

The enlarged surface layer may be formed by digging a plurality of etching pits, and a ratio of an interface length Y to a range length X (Y/X×100) is 110% or more. Here, the interface length Y is a length from an arbitrary start point to an arbitrary end point along the interface between the enlarged surface layer and the carbon layer, and is a length including the carbon layer entering the etching pit, and the range length X is, among vectors connecting the start point and the end point at which the interface length Y is measured in a straight line, a length of a direction component orthogonal to the height direction of the uneven shape.

The uneven shape may be compressed and deformed by pressing.

The carbon layer may contain a scaly carbon material and a spherical carbon material.

An electrolytic capacitor having this electrode body as the cathode is also an aspect of the present invention.

In addition, a method for manufacturing an electrode body used for a cathode of an electrolytic capacitor, includes steps of, forming a carbon layer on a cathode foil made of a valve acting metal and having an enlarged surface layer formed on a surface, and pressing the cathode foil on which the carbon layer is formed, in which an interface between the enlarged surface layer and the carbon layer has an uneven shape.

The cathode foil on which the carbon layer is formed may be pressed with a press line pressure of 1.54 $kNcm^{-1}$ or more.

The carbon layer may be formed by applying a slurry containing scaly carbon and spherical carbon to the cathode foil and drying it.

Advantageous Effects of Disclosure

According to the present invention, even when the carbon layer is used for the cathode body, good capacitance can be emerged.

BRIEF DESCRIPTION OF DRAWINGS

FIGS. 2A and 2B are SEM images of Comparative Example 1, in which FIG. 2A shows no press and FIG. 2B shows a press line pressure of 3.85 $kNcm^{-1}$.

DESCRIPTION OF EMBODIMENTS

The cathode body and the electrolytic capacitor including the cathode body according to the embodiment of the present invention will be described. In the present embodiment, an electrolytic capacitor having an electrolytic solution will be described as an example, however the present disclosure is not limited thereto. It can be applied to any electrolytic capacitor having the electrolytic solution, a solid electrolyte layer such as a conductive polymer, a gel electrolyte, or an electrolyte in which an electrolytic solution is used in combination with the solid electrolyte layer and the gel electrolyte.

(Electrolytic Capacitor)

The electrolytic capacitor is a passive element that stores and discharges electric charges according to the capacitance. This electrolytic capacitor has a wound type or a laminated type capacitor element. The capacitor element is formed by facing the anode foil and the cathode body via a separator, and then impregnating with the electrolytic solution. In this electrolytic capacitor, the cathode side capacitance is generated by an electric double layer action generated at the boundary surface between the electrolytic solution and the cathode body, and the anode side capacitance is generated by a dielectric polarization action.

That is, a dielectric oxide film layer that causes the dielectric polarization action is formed on the surface of the anode foil. On the surface of the cathode body, a carbon layer that causes the electric double layer action at the boundary surface with the electrolytic solution is formed. The electrolytic solution is interposed between the anode foil and the cathode body, and is in close contact with the dielectric oxide film layer of the anode foil and the carbon layer of the cathode body. The separator is interposed between the anode foil and the cathode body and holds the electrolytic solution in order to prevent a short circuit between the anode foil and the cathode body.

When a solid electrolyte is used, the solid electrolyte is conducted by the carbon layer in contact with a current collector, and the capacitance on the anode side by the dielectric polarization action constitutes the capacitance of the electrolytic capacitor.

(Cathode Body)

This cathode body has a two-layer structure of the cathode foil and the carbon layer. The cathode foil serves as the current collector, and an enlarged surface layer is formed on the surface thereof. The carbon layer includes a carbon material and adheres to the enlarged surface layer of the cathode foil.

The cathode foil is a long foil body made of a valve acting metal. The valve acting metal is aluminum, tantalum, niobium, niobium oxide, titanium, hafnium, zirconium, zinc, tungsten, bismuth, antimony and the like. The purity is preferably about 99% or more, however impurities such as silicon, iron, copper, magnesium, and zinc may be contained. As the cathode foil, for example, an aluminum material having a temper designation of H defined in JIS standard H0001, a so-called H material, or an aluminum material having a temper designation of O defined in JIS standard H0001, a so-called O material, may be used. When a highly rigid metal foil made of H material is used, deformation of the cathode foil due to press working described later can be suppressed.

In this cathode foil, an enlarging treatment is applied to the metal foil in which the valve acting metal is stretched. The enlarged surface layer is formed by electrolytic etching, chemical etching, sandblasting, or the like, or by depositing or sintering metal particles or the like on the metal foil. Examples of the electrolytic etching include methods such as DC etching and AC etching. In chemical etching, the metal foil is immersed in an acid solution or an alkaline solution. The formed enlarged surface layer is a layer region having a tunnel-shaped etching pit dug from the foil surface toward the foil core portion or a sponge-shaped etching pit. Note that the etching pit may be formed so as to penetrate the cathode foil.

In the carbon layer, the carbon material is fibrous carbon, carbon powder, or a mixture thereof. The fibrous carbon is a carbon nanotube, a carbon nanofiber, or the like. The carbon nanotube may be a single-walled carbon nanotube in which the graphene sheet is one layer, or a multi-walled carbon nanotube (MWCNT) in which two or more layers of graphene sheets are coaxially rolled and the tube wall is multi-walled. The carbon powder is natural plant tissue such as coconut shell, synthetic resin such as phenol, activated carbon made from fossil fuel such as coal, coke, pitch, etc., carbon black such as Ketjen black, acetylene black, channel black, carbon nanohorn, amorphous carbon, natural graphite, artificial graphite, graphitized Ketjen black, mesoporous carbon, etc. In the electrolytic capacitor using the electrolytic solution as the electrolyte, it is preferable that the carbon material exhibits an electric double layer action.

The fibrous carbon or the carbon powder may be subjected to a pore forming treatment such as an activation treatment or an opening treatment for forming pores. The method for activating the carbon powder varies depending on the raw material to be used, however usually, a conventionally known activation treatment such as a gas activation method or a chemical activation method can be used. Examples of the gas used in the gas activation method include water vapor, air, carbon monoxide, carbon dioxide, hydrogen chloride, oxygen, or a gas composed of a mixture thereof. In addition, the chemicals used in the chemical activation method include alkali metal hydroxides such as sodium hydroxide and potassium hydroxide, alkaline earth metal hydroxides such as calcium hydroxide, inorganic acids such as boric acid, phosphoric acid, sulfuric acid and hydrochloric acid, and inorganic salts such as zinc chloride. During this activation treatment, heat treatment is performed as necessary.

Figure 1A:
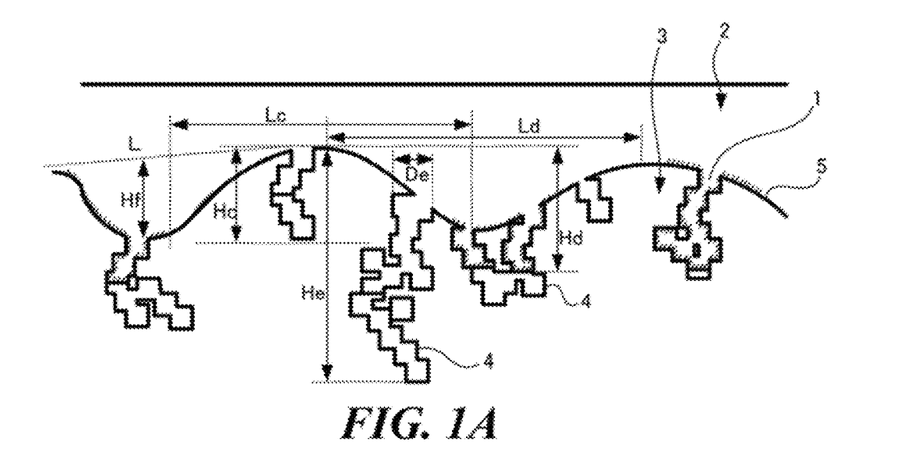
FIGS. 1A and 1B are schematic views illustrating an interface structure between an enlarged surface layer and a carbon layer of the electrode body according to the present embodiment.

FIG. 1A is a schematic view illustrating a surface in which the cathode foil and the carbon layer are in contact, that is, an interface structure between the enlarged surface layer and the carbon layer. Since the carbon layer (reference number 2 in the figure) enters the etching pit (reference number 1 in the figure), a part of the interface between the enlarged surface layer (reference number 3 in the figure) and the carbon layer has fine uneven shape along the etching pit. Hereinafter, the uneven shape in which the carbon layer has entered the etching pit is referred to as etching unevenness (reference number 4 in the figure).

At the interface between the enlarged surface layer and the carbon layer, apart from the etching unevenness, undulating unevenness, that is, unevenness having a long wavelength is generated. Hereinafter, this unevenness is referred to as an outer surface unevenness (reference number 5 in the figure). In other words, assuming that there are no etching pits, the surface of the enlarged surface layer constitutes undulations by connecting convex regions having wide bases to concave regions, and the carbon layer is in close contact with the undulations. The etching unevenness extends continuously toward deep part from the convex region and the concave region of the outer surface unevenness. The outer surface unevenness brings a three-dimensional structure to the surface of the enlarged surface layer and increases the contact area with the carbon layer.

Here, in an aging step of the electrolytic capacitor, an oxide film is formed on exposed portion of the surface of the enlarged surface layer. Further, the increase in the contact area between the enlarged surface layer and the carbon layer leads to a decrease in the exposed portion of the surface of the enlarged surface layer. Then, the outer surface unevenness that increases the contact area between the enlarged surface layer and the carbon layer reduces the area where the oxide film is formed as the entire cathode foil in the aging step. Therefore, compared to the electrolytic capacitor using the cathode foil deposited with titanium nitride, the electrolytic capacitor using the cathode body having the outer surface unevenness at the interface between the enlarged surface layer and the carbon layer increases the capacitance due to charging and discharging in a high frequency region such as 10 kHz, and the reduction rate of the capacitance in a high thermal environment such as 125° C. is also suppressed.

In particular, an appropriate intricacy of the outer surface unevenness enhances the effect of increasing the contact area between the enlarged surface layer and the carbon layer. First, the oxide film is formed on the surface of the enlarged surface layer naturally or due to the electrolytic solution, however when the carbon layer is formed on the enlarged surface layer and pressed, the carbon material of the carbon layer is thrust against the surface of the enlarged surface layer, breaks the oxide film, and the unoxidized enlarged surface layer and the carbon layer come into direct contact with each other. Secondly, the force for further pushing the carbon layer in the concave region into the etching pit is easily transmitted, and the carbon layer penetrates into the enlarged surface layer by the depth including the concave region and the etching pit, the contact area between the carbon layer and the enlarged surface layer is further increased, and the resistance of the cathode body can be reduced.

On the other hand, when the intricacy becomes complicated to a certain extent, it becomes difficult to transmit the force for further pushing the carbon layer that has entered the concave region into the etching pit. Therefore, when the intricacy becomes complicated to the certain extent, the capacitance is improved, however the degree of improvement is limited.

The outer surface unevenness having the appropriate intricacy are as follows. First, the unevenness depth Hf of the outer surface unevenness is preferably 0.5 μm or more. The unevenness depth Hf of the outer surface indicates the distance to the deepest concave portion of the outer surface unevenness with reference to a flat line L which is a line connecting the two vertices of the outer surface unevenness. The cross section of the cathode body may be photographed with a scanning electron microscope, and the distance to the deepest concave portion may be measured with reference to the flat line connecting the two highest convex portions of the outer surface unevenness on the SEM image. By setting the unevenness depth Hf of the outer surface to 0.5 μm or more, the adhesion to the carbon layer is enhanced.

The length Lc of the convex region of the outer surface unevenness is in the range of 1.5 μm or more and 8.0 μm or less, and the average is about 2.9 μm to 4.0 μm, and the height Hc of the convex region of the outer surface unevenness is in the range of 0.15 μm or more and 0.80 μm or less, and the average is about 0.3 μm to 0.6 μm. The length Lc of the convex region is the distance between both ends in a cross section obtained by cutting the convex region along the height direction. The length Ld of the concave region is in the range of 2.0 μm or more and 7.7 μm or less, and the average is about 3.8 μm. Regarding each numerical value representing the outer surface unevenness, the cross section of the cathode body may be photographed with a scanning electron microscope and measured it on the SEM image. The average may be measured by extracting 5 points.

However, even in this range, when the undulation of the outer surface unevenness is significant, that is, when the length Lc of the convex region of the outer surface unevenness is in the range of 3.77 μm or less, compared with the cathode body deposited with titanium nitride, the superiority in terms of capacitance deterioration during use in a high thermal environment such as 125° C. and in a high frequency region such as 10 kHz is reduced. On the other hand, when the undulation of the outer surface unevenness becomes gentle, that is, when the outer surface unevenness is present however the length Lc of the convex region of the outer surface unevenness is 3.78 μm or more, compared with the cathode body deposited with titanium nitride, the superiority in terms of capacitance deterioration during use in a high thermal environment such as 125° C. and in a high frequency region such as 10 kHz is great.

The deepest distance Hd of the carbon layer pushed further into the etching pit from the interface in the concave region by the outer surface unevenness is 0.42 μm or more and 1.40 μm or less in the depth direction from the apex of the convex region adjacent to the concave region, and the average is about 0.54 μm to 0.96 μm. When the outer surface unevenness is gentle, the average is 0.7 μm or more. When it is 0.5 μm or less, the effect of improving the capacitance is small. When it is 0.7 μm or more, it has a good capacitance and high thermal stability. Thermal stability means that there is little deterioration of capacitance in the high temperature environment.

The etching pit has a diameter De in the range of 0.12 μm or more and 0.43 μm or less in the vicinity of the surface, and has an average diameter of about 0.25 μm. Further, the etching pit by the etching treatment has a depth He in the range of 1.5 μm or more and 5.0 μm or less, and has an average depth of about 3.3 μm.

Figure 1B:
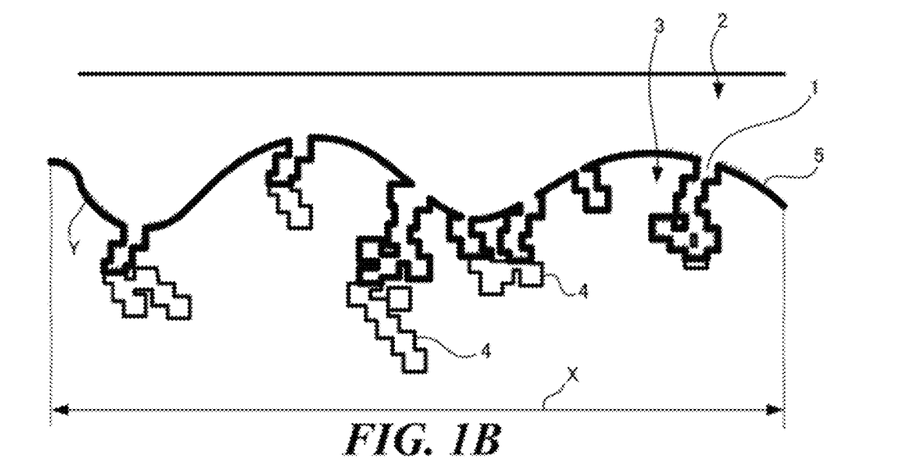

Further, another index is shown for the outer surface unevenness having the appropriate intricacy. FIG. 1B is a cross-sectional view cut along the height direction of the unevenness, in other words, a cross-sectional view cut along the thickness direction of the cathode body from the surface of the cathode body toward the deep part. In this cross section, the length along the interface between the enlarged surface layer and the carbon layer from an arbitrary start point to an arbitrary end point is defined as the interface length Y. This interface contains the carbon layer that enters the etching pit. Further, among the vectors connecting the start point and the end point at which the interface length Y is measured in a straight line, a range length X is a length of the direction component in which the height of the unevenness is constant, that is, the direction component orthogonal to the height direction of the unevenness.

At this time, the ratio of the interface length Y to the range length X is preferably 110% or more. Less than 110% indicates that almost no outer surface unevenness is formed, when there is no load at 20° C., each charging/discharging capacitance at 120 Hz and 10 kHz after applying a DC 2.4V load for 250 hours under a 125° C. environment is inferior to that of an electrolytic capacitor made of the cathode body deposited with titanium nitride.

Further, it is preferable that most of the voids in the carbon layer disappear and the carbon layer is dense. The porosity of the carbon layer is preferably less than 18%. Since the porosity of the carbon layer is small, the adhesion between the carbon layer and the etching surface is improved. The porosity of the carbon layer is calculated by (area of the carbon layer void portion/area of the entire carbon layer)×100. The porosity can be calculated by analyzing each cross-sectional SEM image (observation magnification: 25,000 times) using an image analysis software ImageJ (NIH, National Institutes of Health).

A method of forming an interface structure having the outer surface unevenness and the etching unevenness will be illustrated. However, the method is not limited to the illustrated method as long as the interface structure is composed of the outer surface unevenness and the etching unevenness. For example, the etching pits may be removed from the surface of the enlarged surface layer by another method such as shot peening to form unevenness with undulations.

First, the surface enlarged layer is formed on the cathode foil. Typically, the enlarged surface layer is formed by direct current etching or alternating current etching in which direct current or alternating current is applied in an acidic aqueous solution such as nitric acid, sulfuric acid, or hydrochloric acid.

Regarding the carbon layer, the powder of the carbon material is dispersed in a solvent, and a binder is added to prepare a slurry. Solvents include alcohols such as methanol, ethanol, and 2-propanol, hydrocarbon solvents, aromatic solvents, amide solvents such as N-methyl-2-pyrrolidone (NMP) and N, N-dimethylformamide (DMF), water and mixtures thereof. As the dispersion method, a mixer, jet mixing (jet collision), ultracentrifugation treatment, or other ultrasonic treatment is used. In the dispersion step, the carbon material powder and the binder in the mixed solution are subdivided and homogenized and dispersed in the solution. Examples of the binder include styrene-butadiene rubber.

Next, the slurry is applied to the enlarged surface layer, dried, and then pressed at a predetermined pressure to contact the cathode foil and the carbon layer into closely with each other and integrate them. It is considered that the interface structure between the enlarged surface layer and the carbon layer is formed in the pressing process in which the cathode foil and the carbon layer are brought into close contact with each other.

In this pressing process, the carbon material of the carbon layer is pressed against the enlarged surface layer, and the entire surface of the cathode foil is compressed and deformed. Further, the dense region of the etching pit is greatly compressed and deformed. As a result, the surface state of the smooth cathode foil is deformed, and undulating unevenness are created at the interface between the enlarged surface layer and the carbon layer. In addition, at the same time as the appearance of the unevenness, the enlarged surface layer and the carbon layer are in close contact with each other. Furthermore, the carbon material breaks through the natural oxide film existing on the surface of the cathode foil and comes into direct contact with the cathode foil. In this way, after the pressing process of a predetermined pressure is performed, the formation of the outer surface unevenness and the close contact between the enlarged surface layer and the carbon layer are achieved at the same time, and a gap is less likely to occur between the undulating enlarged surface layer and the carbon layer.

In this pressing step, for example, press line pressure is applied to the cathode foil coated with the carbon layer by a press roller. At this time, the press roller to which heat equal to or higher than the softening temperature of the binder contained in the carbon layer is applied may be used. By doing so, the fluidity of the carbon layer is increased. Therefore, the carbon layer easily enters the etching pit, the contact area between the carbon layer and the cathode foil increases, and the interfacial resistance becomes lower.

Further, a gentle outer surface unevenness is formed by press working at the predetermined pressure, and the gentle outer surface unevenness makes it easy for the press pressure to be transmitted to the carbon layer in the concave region, and the carbon layer in the concave region further becomes easier to enter the etching pit. Further, the carbon layer is compressed by the press working, and the voids in the carbon layer are easily eliminated. It is desirable that the linear pressure by the press presses so that the carbon material penetrates the natural oxide film existing on the surface of the cathode foil and comes into direct contact with the cathode foil, specifically, 1.54 kNcm$^{-1}$ or more is desirable, and more preferably 3.85 kNcm$^{-1}$ or more. When the press line pressure is 1.54 kNcm$^{-1}$ or more, the outer surface unevenness is formed, and when the press line pressure is 3.85 kNcm$^{-1}$ or more, the outer surface unevenness becomes gentle.

The carbon material that assists in the change of the interface structure is preferably a mixture of a scaly carbon material and a spherical carbon material. The scaly carbon material is easy to press against the enlarged surface layer, is easily and orderly spread on the interface with the enlarged surface layer, and is easily pushed against the natural oxide film on the foil surface by press bonding, and easily breaks through the natural oxide film. Therefore, the scaly carbon material is easy to mold the interface structure into uneven shape with undulations, and is easy to adhere to the cathode foil at the interface. In addition, the scaly carbon material tends to be orderly stacked at the interface of the enlarged surface layer. Therefore, the scaly carbon material reduces the voids in the carbon layer. The spherical carbon material fills the voids in the carbon layer and easily enters the etching pit during the bonding process with the cathode foil.

Examples of the scaly carbon material include natural graphite, artificial graphite, and graphitized Ketjen black. It is desirable to use the scaly carbons having an aspect ratio of the minor radius to the major radius in the range of 1:5 to 1:100. Examples of the spherical carbon material include carbon black such as Ketjen black (hereinafter, KB), acetylene black, and channel black. The primary particle size of carbon black is preferably 100 nm or less, and it is easy to enter the deep part of the etching pit. In general, these scaly carbon materials and spherical carbon materials have a smaller specific surface area and a smaller electric double layer capacity than activated carbon and carbon nanotubes, and therefore generally serve as a conductive auxiliary agent rather than an active material. However, in this electrolytic capacitor, a sufficient cathode side capacitance is drawn out due to the interface structure between the enlarged surface layer and the carbon layer, that is, the generation of the outer surface unevenness or the further generation of the etching unevenness.

Of course, in addition to these scaly carbon materials and spherical carbon materials, activated carbon, carbon nanotubes, and the like may be contained, and only these scaly carbon materials and spherical carbon materials may be contained in the carbon layer as active materials. Activated carbon and carbon nanotubes have a large specific surface area due to delocalized pi electrons. In addition, in this electrolytic capacitor, since a sufficient cathode side capacitance is drawn out due to the outer surface unevenness or the etching unevenness on the interface between the enlarged surface layer and the carbon layer, the scaly carbon materials and the spherical carbon materials may not be subjected to the pore forming treatment. Of course, the scaly carbon materials and the spherical carbon materials may also be used after being subjected to a pore forming treatment.

(Anode Foil)

The anode foil is a long foil body made of a valve acting metal. The purity is preferably about 99.9% or more with respect to the anode foil. This anode foil is formed by etching a stretched foil, sintering powder of the valve acting metal, or depositing a film of metal particles or the like on the foil to apply the film. The anode foil has an enlarged surface layer or a porous structure layer on a surface.

A dielectric oxide film layer formed on the anode foil is typically an oxide film formed on the surface layer of the anode foil, and when the anode foil is made of aluminum, it is an aluminum oxide layer obtained by oxidizing a porous structural region. This dielectric oxide film layer is formed by a formation treatment in which a voltage is applied in an acid such as ammonium borate, ammonium phosphate, ammonium adipate, or a solution in the absence of halogen ions such as an aqueous solution of these acids. The natural oxide film layer may be formed on the cathode foil, and the dielectric oxide film layer may be intentionally provided.

(Separator)

Separator includes celluloses such as kraft, Manila hemp, esparto, hemp, and rayon, and mixed papers thereof, polyethylene terephthalates, polybutylene terephthalates, polyethylene naphthalates, polyester resins such as derivatives thereof, polytetrafluoroethylene resins, polyvinylidene fluoride resin, vinylon resin, aliphatic polyamide, semi-aromatic polyamide, polyamide resin such as total aromatic polyamide, polyimide resin, polyethylene resin, polypropylene resin, trimethylpentene resin, polyphenylene sulfide resin, acrylic resin and the like, these resins may be used alone or in combination.

(Electrolytic Solution)

The electrolytic solution is a mixed solution in which a solute is dissolved in a solvent and additives are added as needed. The solvent may be water, a protic organic polar solvent or an aprotic organic polar solvent. Typical examples of the protic organic polar solvents include monohydric alcohols, polyhydric alcohols, and oxyalcohol compounds. Typical examples of the aprotic organic polar solvents include sulfone-based, amide-based, lactones, cyclic amide-based, nitrile-based, and oxide-based solvents.

Examples of the monohydric alcohols include ethanol, propanol, butanol, pentanol, hexanol, cyclobutanol, cyclopentanol, cyclohexanol, benzyl alcohol and the like. Examples of the polyhydric alcohols and the oxyalcohol compounds include ethylene glycol, propylene glycol, glycerin, methyl cellosolve, ethyl cellosolve, methoxypropylene glycol, dimethoxypropanol and the like. Examples of the sulfone-based include dimethyl sulfone, ethyl methyl sulfone, diethyl sulfone, sulfolane, 3-methyl sulfolane, 2,4-dimethyl sulfolane and the like. Examples of the amide-based include N-methylformamide, N, N-dimethylformamide, N-ethylformamide, N, N-diethylformamide, N-methylacetamide, N, N-dimethylacetamide, N-ethylacetamide, N, N-diethylacetamide and hexamethylphosphoric-amide and the like. Examples of the lactones and the cyclic amide-based include γ-butyrolactone, γ-valerolactone, 5-valerolactone, N-methyl-2-pyrrolidone, ethylene carbonate, propylene carbonate, butylene carbonate, isobutylene carbonate, isobutylene carbonate and the like. Examples of the nitrile-based include acetonitrile, 3-methoxypropionitrile, glutaronitrile and the like. Examples of the oxide-based include dimethyl sulfoxide and the like. As the solvent, these may be used alone, or two or more kinds may be combined.

The solute contained in the electrolytic solution contains anionic and cationic components, and is typically an organic acid or a salt thereof, an inorganic acid or a salt thereof, or a composite compound of the organic acid and the inorganic acid or a salt having an ion dissociative property thereof, and is used alone or in combination of two or more. An acid as an anion and a base as a cation may be separately added to the electrolytic solution as solute components.

Organic acids that become anionic components in the electrolytic solution include oxalic acid, succinic acid, glutaric acid, pimelic acid, suberic acid, sebacic acid, phthalic acid, isophthalic acid, terephthalic acid, maleic acid, adipic acid, benzoic acid, and toluyl acid, enanthic acids, malonic acids, carboxylic acids such as 1,6-decandicarboxylic acid, 1,7-octanedicarboxylic acid, azelaic acid, undecanedioic acid, dodecanedioic acid, tridecanedioic acid, phenols and sulfonic acids. Examples of the inorganic acid include boric acid, phosphoric acid, phosphorus acid, hypophosphorous acid, carbonic acid, silicic acid and the like. Examples of the composite compound of the organic acid and the inorganic acid include borodisalicylic acid, borodioxalic acid, and borodiglycolic acid.

Further, examples of at least one salt of the organic acid, the inorganic acid, and the composite compound of the organic acid and the inorganic acid include ammonium salts, quaternary ammonium salts, quaternary amidinium salts, amine salts, sodium salts, and potassium salts, and the like. Examples of the quaternary ammonium ion of the quaternary ammonium salts include tetramethylammonium, triethylmethylammonium, tetraethylammonium and the like. Examples of the quaternary amidiniums include ethyldimethylimidazolinium and tetramethylimidazolinium. Examples of amines in the amine salts include primary amines, secondary amines, and tertiary amines. Primary amines include methylamine, ethylamine and propylamine, secondary amines include dimethylamine, diethylamine, ethylmethylamine and dibutylamine, and tertiary amines include trimethylamine, triethylamine, tributylamine, ethyldimethylamine, and ethyldiisopropylamine and the like.

Further, other additives may be added to the electrolytic solution. Additives include polyethylene glycol, complex compounds of boric acid and polysaccharides (mannit, sorbit, etc.), complex compounds of boric acid and polyhydric alcohol, borate esters, nitro compounds (o-nitrobenzoic acid, m-nitrobenzoic acid, p-nitrobenzoic acid, o-nitrophenol, m-nitrophenol, p-nitrophenol, etc.), phosphate esters and the like. These may be used alone, or two or more kinds may be combined.

When a solid electrolyte is used as the electrolyte, polythiophene such as polyethylenedioxythiophene and conductive polymers such as polypyrrole and polyaniline can be mentioned.

EXAMPLES

Hereinafter, the present invention will be described in more detail based on Examples. The present invention is not limited to the following examples.

(Cathode Body)

First, various cathode bodies were prepared. The aluminum foil shown in Table 1 below was prepared as the cathode foil. In Table 1, the etching magnification indicates a magnification of a surface area after the etching treatment to a surface area of a plane which is a surface area before the etching treatment. The etched layer thickness indicates an average depth from the surface to the deepest part of the etching pit. The residual core thickness indicates a thickness of the layer to which the etching pit has not reached. The oxide film is indicated by a nominal formation voltage. That is, with respect to the cathode foils of a foil type 1, a foil type 2 and a foil type 4, a voltage was applied with an aqueous solution of ammonium dihydrogen phosphate to intentionally form the oxide film layer. The formation treatment was not performed for the cathode foil of a foil type 3.

TABLE 1

| Foil type | Foil type 1 | Foil type 2 | Foil type 3 | Foil type 4 |
| --- | --- | --- | --- | --- |
| Foil thickness (μm) | 20 | 21 | 21 | 30 |
| Etching magnification | 1 | 7 | 17 | 22 |
| Etched layer thickness (μm) | 0 | 6 | 8 | 11 |

TABLE 1-continued

| Foil type | Foil type 1 | Foil type 2 | Foil type 3 | Foil type 4 |
| --- | --- | --- | --- | --- |
| Residual core thickness (μm) | 20 | 15 | 13 | 19 |
| Oxide film ($V_{fs}$) | 1.2 | 1.2 | 0 | 1.2 |

A slurry was prepared under common conditions for the carbon layer formed on the cathode foil of each foil type in Table 1. 16.3 g of graphite was selected as the scaly carbon material, 5 g of carbon black was selected as the spherical carbon material, and 3.7 g of styrene-butadiene rubber was selected as the binder. Then, these were added to 75 ml of pure water adjusted to pH 8 with ammonia, and dispersed by a stirrer. This slurry was applied to each cathode foil and dried at 100° C. The particle size of graphite is 4 μm, the primary particle size of carbon black is 35 nm, and the activation treatment or the opening treatment was not performed for both.

Then, as shown in Table 2 below, by applying each press line pressure to each cathode foil coated with the carbon layer, various cathode bodies having different etching treatment and press line pressure were produced. For the press line pressure, a press machine manufactured by Takumi Giken Co., Ltd. was used. In this pressing process, the diameter of the press roller was 180 mm, the press processing width was 130 mm, and the cathode body was conveyed once at 3 m/min.

TABLE 2

| | Foil type | Etching magnification | Press line pressure (KN cm$^{-1}$) |
| --- | --- | --- | --- |
| Comparative Example 1 | 1 | 1 | 0 |
| | | | 1.54 |
| | | | 3.85 |
| | | | 7.69 |
| Comparative Example 2 | 2 | 7 | 0 |
| Example 1 | | | 1.54 |
| Example 2 | | | 3.85 |
| Example 10 | | | 5.38 |
| Example 3 | | | 7.69 |
| Comparative Example 3 | 3 | 17 | 0 |
| Example 4 | | | 1.54 |
| Example 5 | | | 3.85 |
| Example 6 | | | 7.69 |
| Comparative Example 4 | 4 | 22 | 0 |
| Example 7 | | | 1.54 |
| Example 8 | | | 3.85 |
| Example 9 | | | 7.69 |

As shown in Table 2, an electrolytic capacitor using the unetched foil type 1 is referred to as Comparative Example 1 regardless of the press line pressure. Among electrolytic capacitors using foil type 2 having an etching magnification of 7 times, unpressed capacitor is referred to as Comparative Example 2, then capacitors are referred to as Examples 1 to 3 in ascending order of the press line pressure, and the capacitor with the press line pressure between Example 2 and Example 3 is referred to as Example 10. Among electrolytic capacitors using foil type 3 having an etching magnification of 17 times and the oxide film was unformed, unpressed capacitor is referred to as Comparative Example 3, then capacitors are referred to as Examples 4 to 6 in ascending order of the press line pressure. Among electrolytic capacitors using foil type 4 having an etching magnification of 22 times, unpressed capacitor is referred to as Comparative Example 4, then capacitors are referred to as Examples 7 to 9 in ascending order of the press line pressure.

(Cathode Body Cross-Section Observation)

Figure 2A:
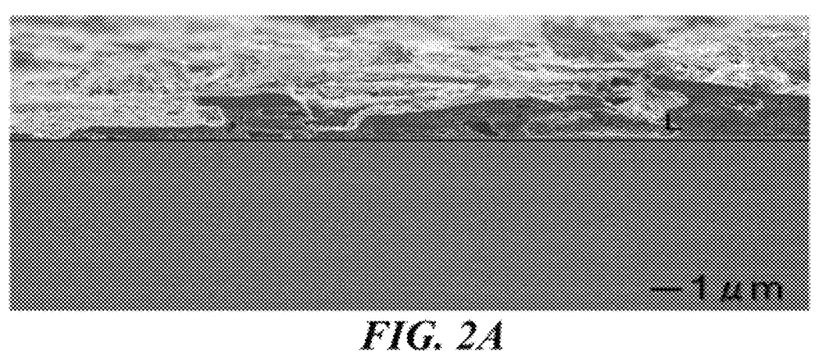
Figure 2B:
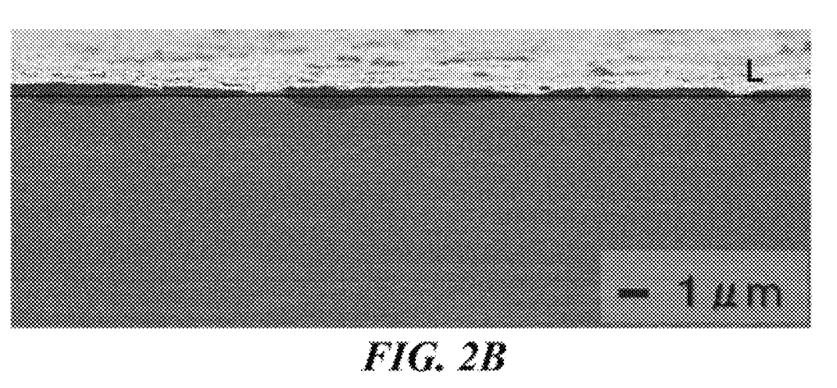
Figure 3:
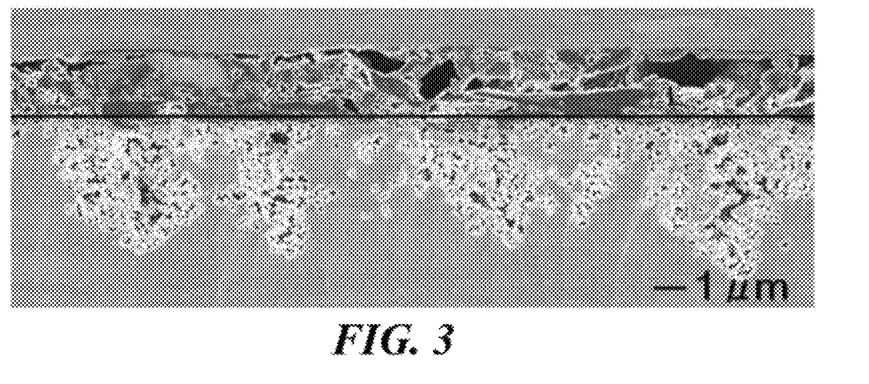
FIG. 3 is an SEM image of Comparative Example 2.
Figure 4A:
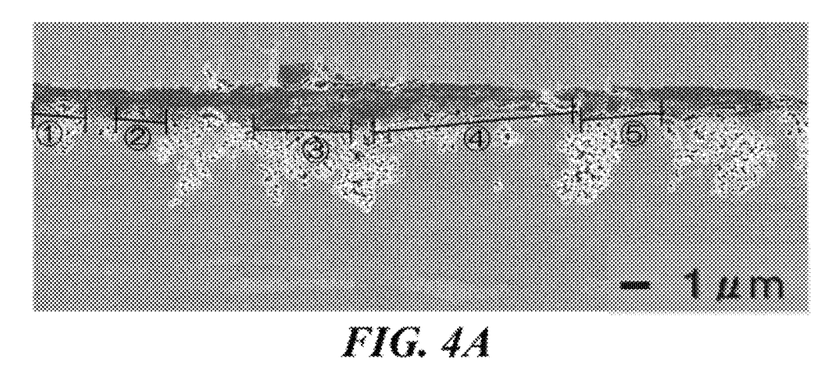
FIGS. 4A and 4B are SEM images of Example 1.
Figure 4B:
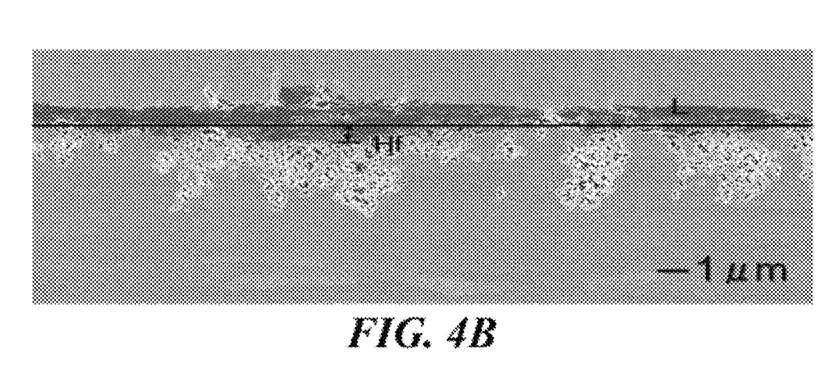
Figure 5A:
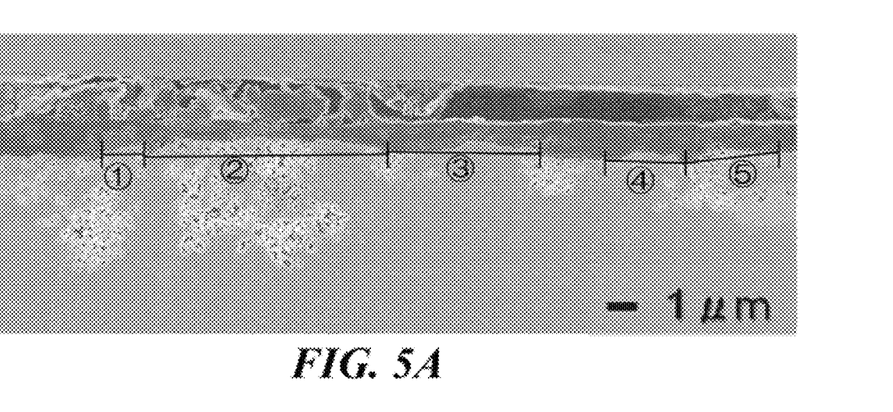
FIGS. 5A and 5B are SEM images of Example 2.
Figure 5B:
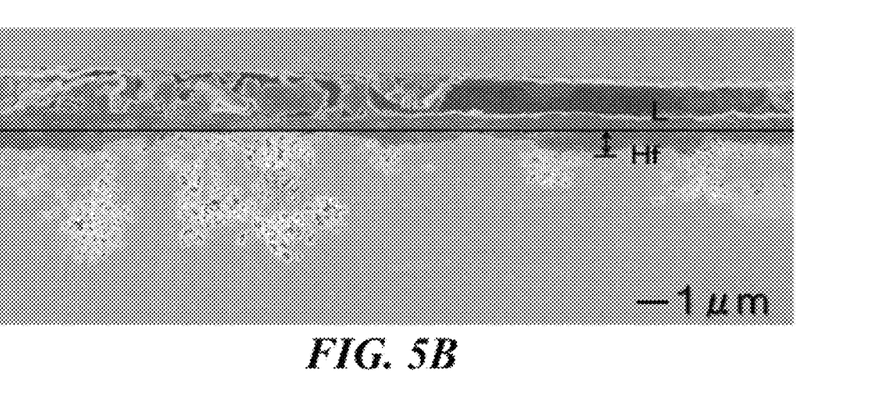
Figure 6A:
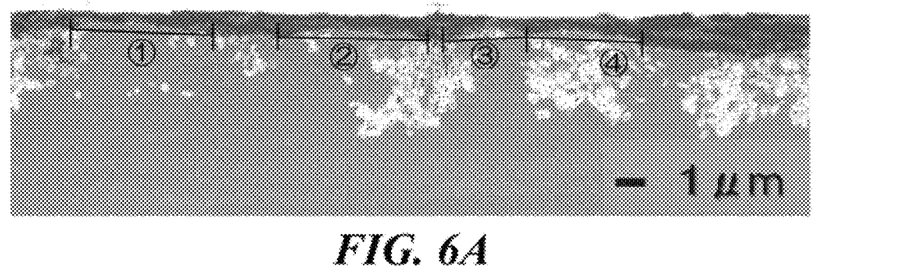
FIGS. 6A and 6B are SEM images of Example 3.
Figure 6B:
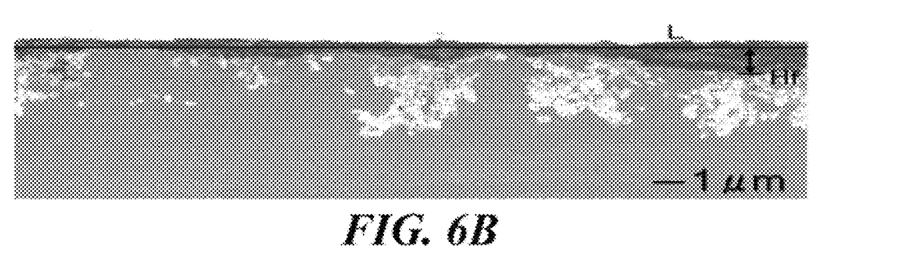
Figure 7A:
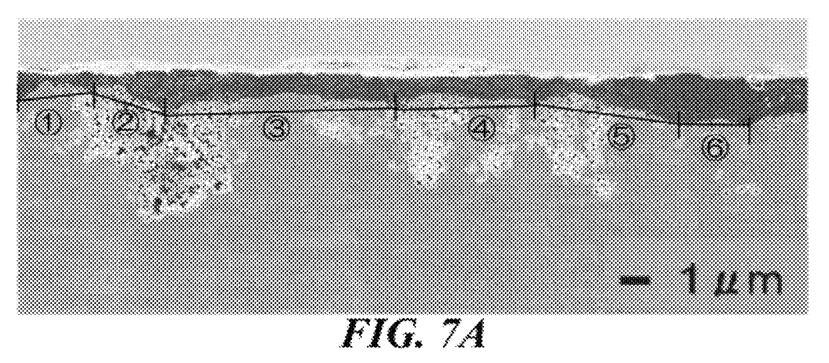
FIGS. 7A and 7B are SEM images of Example 5.
Figure 7B:
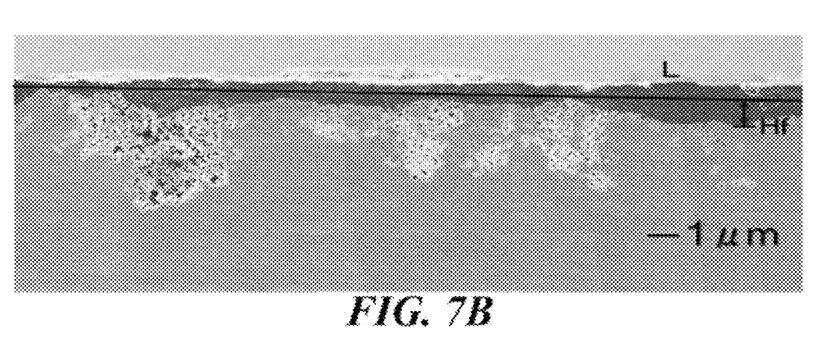
Figure 8A:
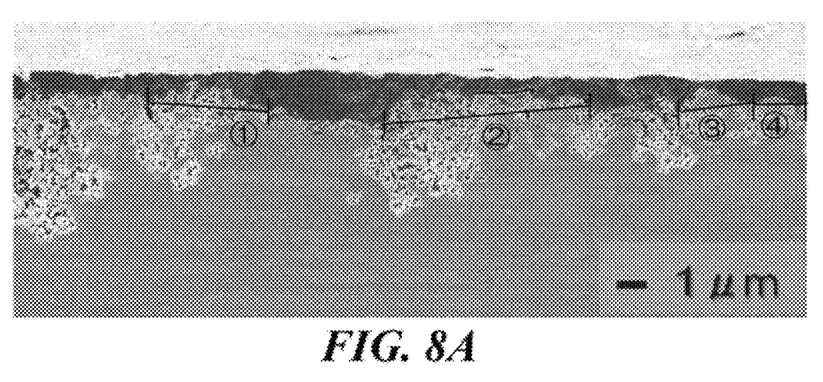
FIGS. 8A and 8B are SEM images of Example 8.
Figure 8B:
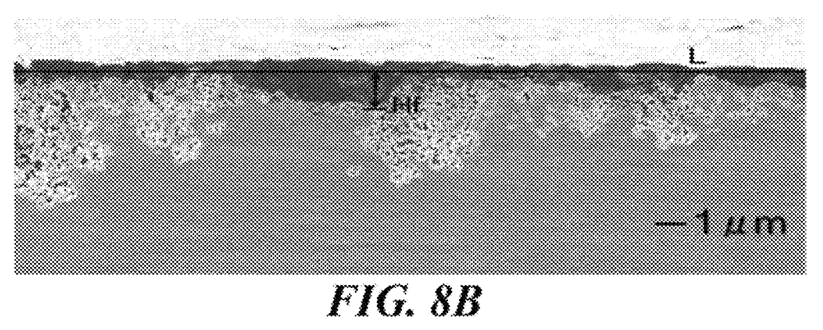

Cross sections of the cathode bodies of Comparative Example 1, Comparative Example 2, Examples 1 to 3, Example 5 and Example 8 were photographed with a scanning electron microscope at a magnification of 5,000 to obtain SEM images. The results are shown in FIGS. 2A to 8B. FIGS. 2A and 2B are SEM images of Comparative Example 1, in which FIG. 2A shows a cathode body at the press line pressure of 0 $Ncm^{-1}$ and FIG. 2B shows a cathode body at the press line pressure of 3.85 $kNcm^{-1}$. FIG. 3 is an SEM image of Comparative Example 2. FIGS. 4A and 4B are an SEM image of Example 1, FIGS. 5A and 5B are an SEM image of Example 2, FIGS. 6A and 6B are an SEM image of Example 3, FIGS. 7A and 7B are an SEM image of Example 5, and FIGS. 8A and 8B are an SEM image of Example 8. In FIGS. 4A to 8B, both A and B are the same image, however A shows the convex portion length Lc, and B shows the unevenness depth Hf.

As shown in FIGS. 2A, 2B, and 3, in the cathode bodies of Comparative Example 1 and Comparative Example 2, the interface between the enlarged surface layer and the carbon layer is substantially along the flat line L. On the other hand, it is obvious by comparing FIGS. 4A and 4B to 8A and 8B with respect to FIGS. 2A and B and 3, the cathode bodies of Examples 1 to 3, Examples 5, and Example 8 are the interfaces between the enlarged surface layer and the carbon layer are not along the flat line L, and it was confirmed that the outer surface unevenness was present, and the etching unevenness was also confirmed.

When the length Lc and height Hc of each convex region 1 to 6 confirmed from the SEM images of FIGS. 4A to 8B were measured and the porosity of the carbon layer was measured, the results shown in Table 3 below were obtained. In the table, the unit of numerical values for length and height is μm.

TABLE 3

| Convex shape | Example 1 | Example 2 | Example 3 | Example 5 | Example 8 |
|---|---|---|---|---|---|
| Length of convex 1 | 1.64 | 1.52 | 3.90 | 2.40 | 3.94 |
| Length of convex 2 | 1.63 | 7.64 | 5.25 | 2.26 | 7.38 |
| Length of convex 3 | 1.84 | 5.45 | 2.67 | 7.25 | 2.27 |
| Length of convex 4 | 6.40 | 2.48 | 3.63 | 4.22 | 1.72 |
| Length of convex 5 | 3.04 | 2.86 | — | 4.57 | — |
| Length of convex 6 | — | — | — | 1.98 | — |
| Average length | 2.91 | 3.99 | 3.86 | 3.78 | 3.82 |
| Height of convex 1 | 0.34 | 0.37 | 0.34 | 0.54 | 0.52 |
| Height of convex 2 | 0.15 | 0.52 | 0.34 | 0.35 | 0.80 |
| Height of convex 3 | 0.16 | 0.46 | 0.38 | 0.50 | 0.63 |
| Height of convex 4 | 0.40 | 0.30 | 0.30 | 0.46 | 0.29 |
| Height of convex 5 | 0.46 | 0.36 | — | 0.50 | — |
| Height of convex 6 | — | — | — | 0.20 | — |
| Average height | 0.30 | 0.40 | 0.34 | 0.43 | 0.56 |
| Porosity | 17.1% | 14.1% | 9.9% | 8.6% | 6.2% |

As shown in Table 3, in detail, the cathode body of Example 1 is formed with the outer surface unevenness with significant undulations within an appropriate range. The average length Lc of the convex region of the outer surface unevenness of Example 1 is as short as 2.91 μm, and the unevenness is steep. In the first embodiment, although the enlarged surface layer is compressed as a whole, the degree of compression deformation is sparse, and it can be said that a region where the compression deformation is large and a region where the compression deformation is small are conspicuous. In addition, some gaps remain between the carbon layer and the enraged surface layer. Although the etching unevenness is formed, many voids not filled with the carbon material still remain in the etching pits, and the porosity of the carbon layer is also high.

On the other hand, in the cathode bodies of Examples 2, 3, 5 and 8, the undulations of the outer surface unevenness becomes gentle within an appropriate range. The length LC of the convex region of the outer surface unevenness is as long as 3.99 μm, 3.86 μm, 3.78 μm and 3.82 μm. In Examples 2, 3, 5 and 8, the enlarged surface layer was compressed as a whole, the degree of compression deformation is approaching uniformly, however visually recognized as sparse, and the region where the compression deformation is large and the region where the compression deformation is small remain. Almost no gap is confirmed between the carbon layer and the enlarged surface layer. In addition, the etching pit is filled with a large amount of carbon material, the voids are considerably reduced, and the porosity of the carbon layer is also small. When the etching magnification becomes high as in Examples 5 and 8, the porosity of carbon becomes low. Further, it is considered that the the etching magnification becomes high, the average height of the convex portions becomes large, and the interface with the carbon layer undulates larger, so that good adhesion is exhibited.

Next, based on the photographs shown in FIGS. 2A to 8B, the penetration depth Hd of the carbon layer at any five points was measured in the cathode bodies of Comparative Example 1, Examples 1 to 3, Example 5 and Example 8 having the press line pressure of 3.85 $kNcm^{-1}$. That is, the difference in the height direction from the deepest portion of the carbon layer that further entered the etching pit from the concave region, to the apex of the convex region adjacent to the concave region was measured at five points. In addition, based on the photographs shown in FIGS. 2A to 8B, the unevenness depth of the uneven shape (outer surface unevenness) was measured in the cathode bodies of Comparative Example 1, Examples 1 to 3, Example 5 and Example 8 having the press line pressure of 3.85 $kNcm^{-1}$. The results are shown in Table 4.

TABLE 4

| Penetration depth (Hd) | Comparative example 1 (3.85 kN $cm^{-1}$) | Example 1 | Example 2 | Example 3 | Example 5 | Example 8 |
|---|---|---|---|---|---|---|
| First point | 0.36 | 0.70 | 0.82 | 1.22 | 1.18 | 1.40 |
| Second point | 0.36 | 0.62 | 0.76 | 0.96 | 0.98 | 1.16 |
| Third point | 0.28 | 0.50 | 0.72 | 0.62 | 0.90 | 0.84 |
| Fourth point | 0.20 | 0.48 | 0.68 | 0.54 | 0.74 | 0.74 |
| Fifth point | 0.20 | 0.42 | 0.66 | 0.50 | 0.56 | 0.68 |
| Average | 0.28 | 0.54 | 0.73 | 0.77 | 0.87 | 0.96 |
| Maximum | 0.36 | 0.70 | 0.82 | 1.22 | 1.18 | 1.40 |
| Minimum | 0.20 | 0.42 | 0.66 | 0.50 | 0.56 | 0.68 |
| Unevenness depth (Hf) | 0.36 | 0.53 | 0.68 | 0.97 | 0.97 | 1.35 |

As shown in Table 4, in Comparative Example 1 in which the press line pressure was 3.85 kNcm$^{-1}$, the penetration depth Hd was 0.28 µm on average. It was also found that the unevenness depth Hf of the outer surface unevenness was as small as 0.36 µm. This is because Comparative Example 1 is unetched, so there is no room for entering the etching pit, and since it is not etched, it is difficult to compress and deform, and there is no concave region. It also shows the degree of unevenness of the flat cathode foil.

On the other hand, in Example 1, the penetration depth is 0.54 µm or more on average. Further, the unevenness depth Hf of the outer surface unevenness is 0.5 µm or more. In Examples 2, 3, 5 and 8, concave regions are generated according to the density of the etching pits, and the carbon material enters the etching pits from the concave regions, so that the penetration depth is 0.7 µm or more on average. From this, it can be seen that the outer surface unevenness of an appropriate penetration promotes the generation of the etching unevenness.

Regarding the cathode bodies of Examples 4 and 7, the etching magnification of the cathode foil is higher than that of Example 1, however since the same press line pressure of 1.54 kNcm$^{-1}$ as in Example 1 is applied, within the appropriate range, the outer surface unevenness with significant undulations is formed. In addition, regarding the cathode bodies of Examples 6 and 9, since the etching magnification of the cathode foil is higher than that of Example 1 and the press line pressure of more than 3.85 kNcm$^{-1}$ is applied, within the appropriate range, the outer surface unevenness with gentle undulations is formed, and the etching unevenness is also generated.

In addition, from the SEM images of FIGS. 2A to 8B, the ratio of the interface length Y to the range length X was measured with respect to the cathode bodies of Comparative Example 1 having the press line pressure of 0 kNcm$^{-1}$, Comparative Example 1 having the press linear pressure of 3.85 kNcm$^{-1}$, Comparative Example 2, Examples 1 to 3, 5 and 8. Further, the ratio of the interface length Y to the range length X was also measured for the cathode body of Example 10. The results are shown in Table 5.

TABLE 5

| | Measured image | Foil type | Etching magnification | Press line pressure (kN cm$^{-1}$) | Range length (µm) | Interference length (µm) | Y/X × 100 (%) |
|---|---|---|---|---|---|---|---|
| Comparative Example 1 | FIG. 2A | 1 | 1 | 0 | 26 | 26.00 | 100.0 |
| Comparative Example 1 | FIG. 2B | 1 | 1 | 3.85 | 26 | 26.17 | 100.7 |
| Comparative Example 2 | FIG. 3 | 2 | 7 | 0 | 26 | 27.27 | 104.6 |
| Example 1 | FIG. 4 | 2 | 7 | 1.54 | 26 | 29.79 | 114.6 |
| Example 2 | FIG. 5 | 2 | 7 | 3.85 | 26 | 29.65 | 114.0 |
| Example 10 | — | 2 | 7 | 5.38 | 26 | 30.91 | 118.9 |
| Example 3 | FIG. 6 | 2 | 7 | 7.69 | 26 | 32.21 | 123.9 |
| Example 5 | FIG. 7 | 3 | 17 | 3.85 | 26 | 29.81 | 114.7 |
| Example 8 | FIG. 8 | 4 | 22 | 3.85 | 26 | 34.33 | 132.0 |

As shown by the ratio of the interface length Y to the range length X in Table 5, in Comparative Example 1 and Comparative Example 2, the range length X and the interface length Y are almost the same, and the outer surface unevenness is not generated. On the other hand, it is obvious by comparing Comparative Example 2 with Examples 1, 2, 3 and 10, it can be seen that the ratio of Examples 1, 2 and 10 was 110% or more, the outer surface unevenness was generated, and the surface area of the cathode body was improved. Further, it is obvious by comparing Example 5 and Example 8, it can be seen that the outer surface unevenness was also generated in Examples 5 and 8 and the surface area of the cathode body was improved.

Figure 9A:
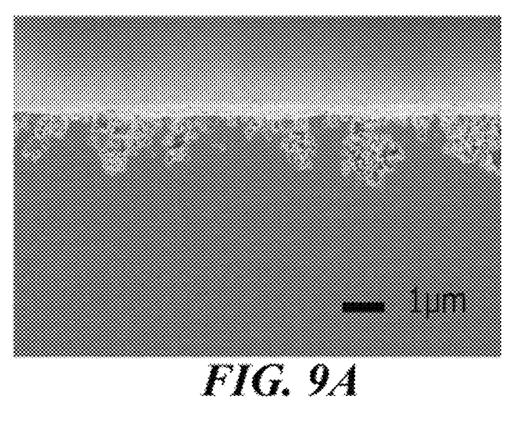
FIGS. 9A-9C are SEM images of the cathode foil in which the carbon layer does not exist.
Figure 9B:
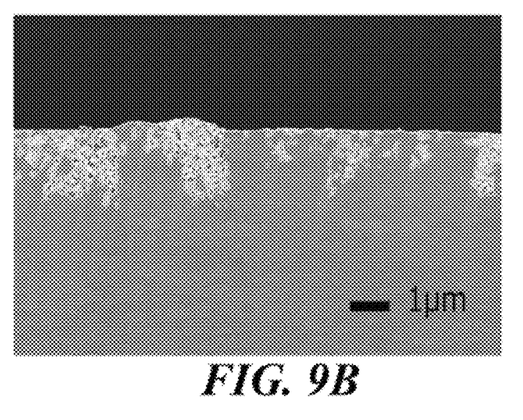
Figure 9C:
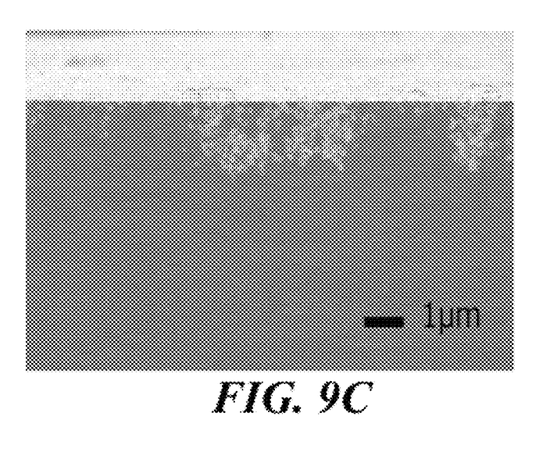

Regarding the cathode bodies of Comparative Example 1 (press line pressure 0 kNcm$^{-1}$) and Comparative Example 2 which were not pressed, there was almost no unevenness depth of the outer surface unevenness, and the outer surface shape was substantially flat. Further, FIGS. 9A-9C comprise an SEM photograph when the cathode foil of the same foil type as in Comparative Example 2 is pressed without a carbon layer, and FIG. 9A shows no press, FIG. 9B shows the press line pressure of 3.85 kNcm$^{-1}$ and FIG. 9C shows a case where the press line pressure is 7.69 kNcm$^{-1}$. As shown in FIGS. 9A-9C, even when the cathode foil was pressed while the carbon layer was absent, even if the press line pressure of 1.54 kNcm$^{-1}$ or more was applied, the outer surface unevenness was not generated.

(Electrolytic Capacitor)

Next, in addition to the cathode bodies of Comparative Examples 1 to 4 and Examples 1 to 9, Comparative Example 5 was prepared by using an etching-untreated plain foil as a substrate current collector, and forming a titanium nitride layer by an electron beam vapor deposition method. Electrolytic capacitors were produced using the cathode bodies of Comparative Examples 1 to 5 and Examples 1 to 9.

In each electrolytic capacitor, an anode foil manufactured under common conditions and various cathode bodies are opposed to each other via the same separator, impregnated with an electrolytic solution prepared under common conditions to form a laminate cell, and a common reformation treatment is performed. Specifically, for all electrolytic capacitors, the aluminum foil was etched to form a dielectric oxide film so that the nominal formation voltage was 4 Vfs, and an aluminum foil having a projected area of 2.1 cm$^2$ was obtained, and this was used as an anode foil. As the separator, rayon was used in all electrolytic capacitors. Further, as an electrolytic solution common to all electrolytic capacitors, it was prepared by using tetramethylimidazolium phthalate as the solute and γ-butyl lactone as the solvent. At the time of reformation, a voltage of 3.35 V was applied for 60 minutes in an environment of 105° C. for all electrolytic capacitors.

(Capacitance Test)

Then, the electrolytic capacitors of Comparative Examples 1 to 5 and Examples 1 to 9 were subjected to no load at 20° C. (initial stage) and a load of 2.4 V DC under a 125° C. environment for 250 hours, then the capacitance (Cap) at 120 Hz and 10 kHz charging/discharging (under load in a high thermal environment) was measured. The results are shown in Table 6.

TABLE 6

| Foil type | Etching magnification | Press line pressure (kN cm⁻¹) | Initial characteristics Cap (μF) :A 120 Hz | Initial characteristics Cap (μF) :A 10 kHz | Characteristics under high thermal enviornment load Cap (μF) :B 120 Hz | Characteristics under high thermal enviornment load Cap (μF) :B 10 kHz | Δ Cap ([B/A × 100)] [%]) 120 Hz | Δ Cap ([B/A × 100)] [%]) 10 kHz |
|---|---|---|---|---|---|---|---|---|
| Comparative Example 1 | 1 | 0 | 88.8 | 5.3 | 17.2 | 2.2 | −80.6 | −57.3 |
|  |  | 1.54 | 135.4 | 16.3 | 23.9 | 2.2 | −82.4 | −86.4 |
|  |  | 3.85 | 137.4 | 29.0 | 35.1 | 2.2 | −74.6 | −92.4 |
|  |  | 7.69 | 153.5 | 49.2 | 76.5 | 2.3 | −50.2 | −95.3 |
| Comparative Example 2 | 2 | 7 | 0 | 184.0 | 26.4 | 102.2 | 14.3 | −44.5 | −45.6 |
| Example 1 |  | 1.54 | 193.5 | 97.4 | 181.4 | 57.5 | −6.3 | −40.9 |
| Example 2 |  | 3.85 | 199.8 | 97.8 | 185.7 | 82.4 | −7.1 | −15.8 |
| Example 3 |  | 7.69 | 193.7 | 96.0 | 178.4 | 83.0 | −7.9 | −13.5 |
| Comparative Example 3 | 3 | 17 | 0 | 216.1 | 68.5 | 153.2 | 31.5 | −29.1 | −54.0 |
| Example 4 |  | 1.54 | 224.0 | 107.3 | 202.3 | 54.0 | −9.7 | −49.7 |
| Example 5 |  | 3.85 | 229.9 | 106.3 | 208.5 | 94.2 | −9.3 | −11.4 |
| Example 6 |  | 7.69 | 223.7 | 103.9 | 200.3 | 91.7 | −10.5 | −11.7 |
| Comparative Example 4 | 4 | 22 | 0 | 205.6 | 50.5 | 94.1 | 37.6 | −54.2 | −25.6 |
| Example 7 |  | 1.54 | 219.6 | 105.8 | 202.3 | 81.9 | −7.9 | −22.6 |
| Example 8 |  | 3.85 | 232.7 | 104.5 | 213.1 | 93.6 | −8.4 | −10.4 |
| Example 9 |  | 7.69 | 235.0 | 103.7 | 210.3 | 91.1 | −10.5 | −12.1 |
| Comparative Example 5 |  |  | 0 | 230.1 | 89.9 | 166.2 | 58.2 | −27.8 | −38.4 |

Note: table columns assigned by position — the "0" press-line-pressure rows belong to the Comparative Examples; subsequent rows under each comparative are the corresponding Examples.

As can be seen by comparing Comparative Example 1 and Comparative Example 5 in Table 6, compared to the electrolytic capacitors made of the cathode body deposited with titanium nitride, the electrolytic capacitor composed of the carbon layer and the cathode foil and using an unetched plain foil was inferior in capacitance in all combinations of initial characteristics and characteristics under high thermal environment load, low frequency region and high frequency region, and the rate of change of capacitance was not good either. Further, when Comparative Example 5 is compared with Comparative Examples 2 to 4, when the outer surface unevenness is not formed at the interface between the enlarged surface layer and the carbon layer even if the etching treatment is performed, almost all the measurement items were inferior to the electrolytic capacitor made of the cathode body deposited with titanium nitride.

On the other hand, as can be seen by comparing Comparative Examples 5 and Examples 1 to 9, compared to the electrolytic capacitors using the cathode body deposited with titanium nitride, electrolytic capacitors with outer surface unevenness formed at the interface between the cathode foil and the carbon layer, in the initial characteristics, the capacitance due to charging/discharging at 10 kHz was improved. Further, as can be seen by comparing Comparative Examples 5 and Examples 8 and 9, due to the outer surface unevenness with gentle undulations and the etching unevenness that reaches a sufficient depth promoted by this outer surface unevenness and high etching magnification, in the initial characteristics, the capacitance due to charging and discharging at 120 Hz becomes larger than the electrolytic capacitor using the cathode body deposited with titanium nitride.

Furthermore, by comparing Comparative Examples 5 and Examples 1 to 9, compared to the electrolytic capacitors using the cathode body deposited with titanium nitride, all electrolytic capacitors having outer surface unevenness formed at the interface between the carbon layer and the enlarged surface layer have a high capacitance in the load characteristics under a high thermal environment when the charge/discharge is 120 Hz. In particular, as can be seen by comparing Comparative Examples 5 and Examples 1 to 9, regarding the rate of increase/decrease in capacitance when the load is applied to the initial capacitance in the high temperature environment, when the outer surface unevenness is formed, the degree of decrease in capacitance was dramatically suppressed in charging/discharging at 120 Hz.

Further, as can be seen by comparing Examples 2, 3, 5, 6, 8 and 9, due to the outer surface unevenness with gentle undulations in the appropriate rage and the etching unevenness that reaches a sufficient depth promoted by this outer surface unevenness, the rate of increase/decrease in capacitance during charging/discharging at 10 kHz was dramatically suppressed.

From the above, the adhesion between the carbon layer and the enlarged surface layer is improved by the outer surface unevenness, and regardless of whether it is in the low frequency region or the high frequency region, whether it is the initial characteristic or the load characteristic under the high temperature environment, it was confirmed that the capacitance was improved and the thermal stability was also improved. In particular, the presence of the outer surface unevenness has higher thermal stability than the case where titanium nitride is deposited on the cathode foil in the combination of the low frequency region and the high temperature thermal environment, and exhibits high capacitance.

In addition, when the undulations of the outer surface unevenness is gentle, even in the high frequency region and high temperature thermal environment, it has higher thermal stability than the case where titanium nitride is deposited on the cathode foil, and exhibits high capacitance. In addition, when the outer surface unevenness is with the gentle undulations and the etching magnification is high, in all combinations of initial characteristics and characteristics under high thermal environment load, low frequency region and high frequency region, it exhibits a capacitance higher than the case where titanium nitride is deposited on the cathode foil.

The invention claimed is:

1. An electrode body used for a cathode of an electrolytic capacitor, comprising:
    a cathode foil made of a valve acting metal, having an enlarged surface layer formed on a surface; and
    a carbon layer formed on the enlarged surface layer, wherein
    an interface between the enlarged surface layer and the carbon layer has an uneven shape;
    the enlarged surface layer is formed by digging a plurality of etching pits;
    a diameter of the etching pit is 0.12 µm or more and 0.43 µm or less near a surface layer;
    a depth of the etching pit is 1.5 µm or more and 5.0 µm or less;
    in the uneven shape, a distance between both ends in a cross section obtained by cutting a convex region along a height direction is 1.5 µm or more and 8.0 µm or less; and
    the uneven shape has the convex region height of 0.15 µm or more and 0.80 µm or less.

2. The electrode body according to claim 1, wherein an unevenness depth of the uneven shape is 0.5 µm or more.

3. The electrode body according to claim 2, wherein;
    the carbon layer further enters the etching pit from an interface of the uneven shape.

4. The electrode body according to claim 2, wherein
    a ratio of an interface length Y to a range length X (Y/X×100) is 110% or more,
    wherein the interface length Y is a length from an arbitrary start point to an arbitrary end point along the interface between the enlarged surface layer and the carbon layer, and is a length including the carbon layer entering the etching pit; and
    the range length X is, among vectors connecting the start point and the end point at which the interface length Y is measured in a straight line, a length of a direction component orthogonal to the height direction of the uneven shape.

5. The electrode body according to claim 2,
    wherein the uneven shape is compressed and deformed by pressing.

6. The electrode body according to claim 1, wherein;
    the carbon layer further enters the etching pit from an interface of the uneven shape.

7. The electrode body according to claim 6,
    wherein the carbon layer penetrates the etching pit by an average of 0.5 µm or more in a depth direction.

8. The electrode body according to claim 7,
    wherein the uneven shape is compressed and deformed by pressing.

9. The electrode body according to claim 6,
    wherein the carbon layer penetrates the etching pit by an average of 0.7 µm or more in a depth direction.

10. The electrode body according to claim 6, wherein
    a ratio of an interface length Y to a range length X (Y/X×100) is 110% or more,
    wherein the interface length Y is a length from an arbitrary start point to an arbitrary end point along the interface between the enlarged surface layer and the carbon layer, and is a length including the carbon layer entering the etching pit; and
    the range length X is, among vectors connecting the start point and the end point at which the interface length Y is measured in a straight line, a length of a direction component orthogonal to the height direction of the uneven shape.

11. The electrode body according to claim 6,
    wherein the uneven shape is compressed and deformed by pressing.

12. The electrode body according to claim 1, wherein
    a ratio of an interface length Y to a range length X (Y/X×100) is 110% or more,
    wherein the interface length Y is a length from an arbitrary start point to an arbitrary end point along the interface between the enlarged surface layer and the carbon layer, and is a length including the carbon layer entering the etching pit; and
    the range length X is, among vectors connecting the start point and the end point at which the interface length Y is measured in a straight line, a length of a direction component orthogonal to the height direction of the uneven shape.

13. The electrode body according to claim 12,
    wherein the uneven shape is compressed and deformed by pressing.

14. The electrode body according to claim 1,
    wherein the uneven shape is compressed and deformed by pressing.

15. The electrode body according to claim 1,
    wherein the carbon layer contains a scaly carbon material and a spherical carbon material.

16. An electrolytic capacitor comprising the electrode body according to claim 1 on the cathode.

17. A method for manufacturing an electrode body used for a cathode of an electrolytic capacitor, comprising steps of:
    forming a carbon layer on a cathode foil made of a valve acting metal and having an enlarged surface layer formed on a surface; and
    pressing the cathode foil on which the carbon layer is formed;
    wherein
    an interface between the enlarged surface layer and the carbon layer has an uneven shape;
    the enlarged surface layer is formed by digging a plurality of etching pits;
    a diameter of the etching pit is 0.12 µm or more and 0.43 µm or less near a surface layer;
    a depth of the etching pit is 1.5 µm or more and 5.0 µm or less;
    in the uneven shape, a distance between both ends in a cross section obtained by cutting a convex region along a height direction is 1.5 µm or more and 8.0 µm or less; and
    the uneven shape has the convex region height of 0.15 µm or more and 0.80 µm or less.

18. The method for manufacturing the electrode body according to claim 17,
    wherein the cathode foil on which the carbon layer is formed is pressed with a press line pressure of 1.54 kNcm$^{-1}$ or more.

19. The electrode body according to claim 17,
    wherein the carbon layer is formed by applying a slurry containing scaly carbon and spherical carbon to a cathode foil and drying it.

* * * * *